W. J. PERKINS.
LIGHT FOCUS SHADE OR DIMMER ZONE.
APPLICATION FILED JAN. 31, 1913.
1,109,014.
Patented Sept. 1, 1914.
3 SHEETS—SHEET 1.
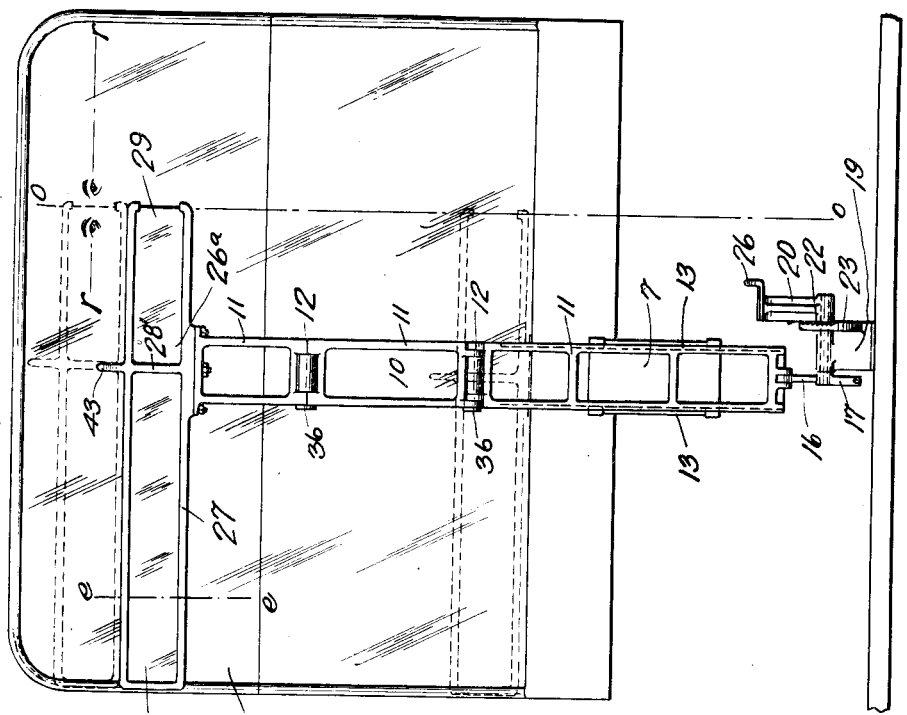
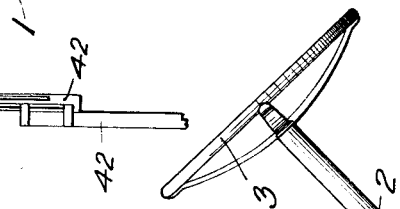
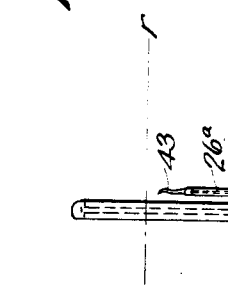
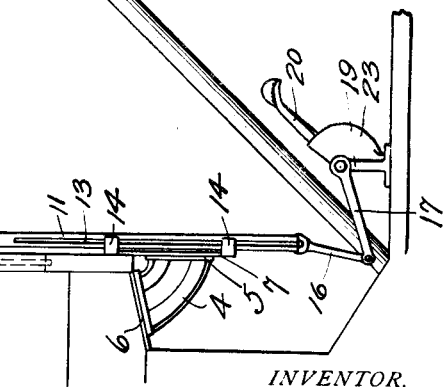
WITNESSES:
J. E. Liverance
L. E. Carroll
INVENTOR.
Willis J. Perkins
BY
Frank E. Liverance Jr.
ATTORNEY.

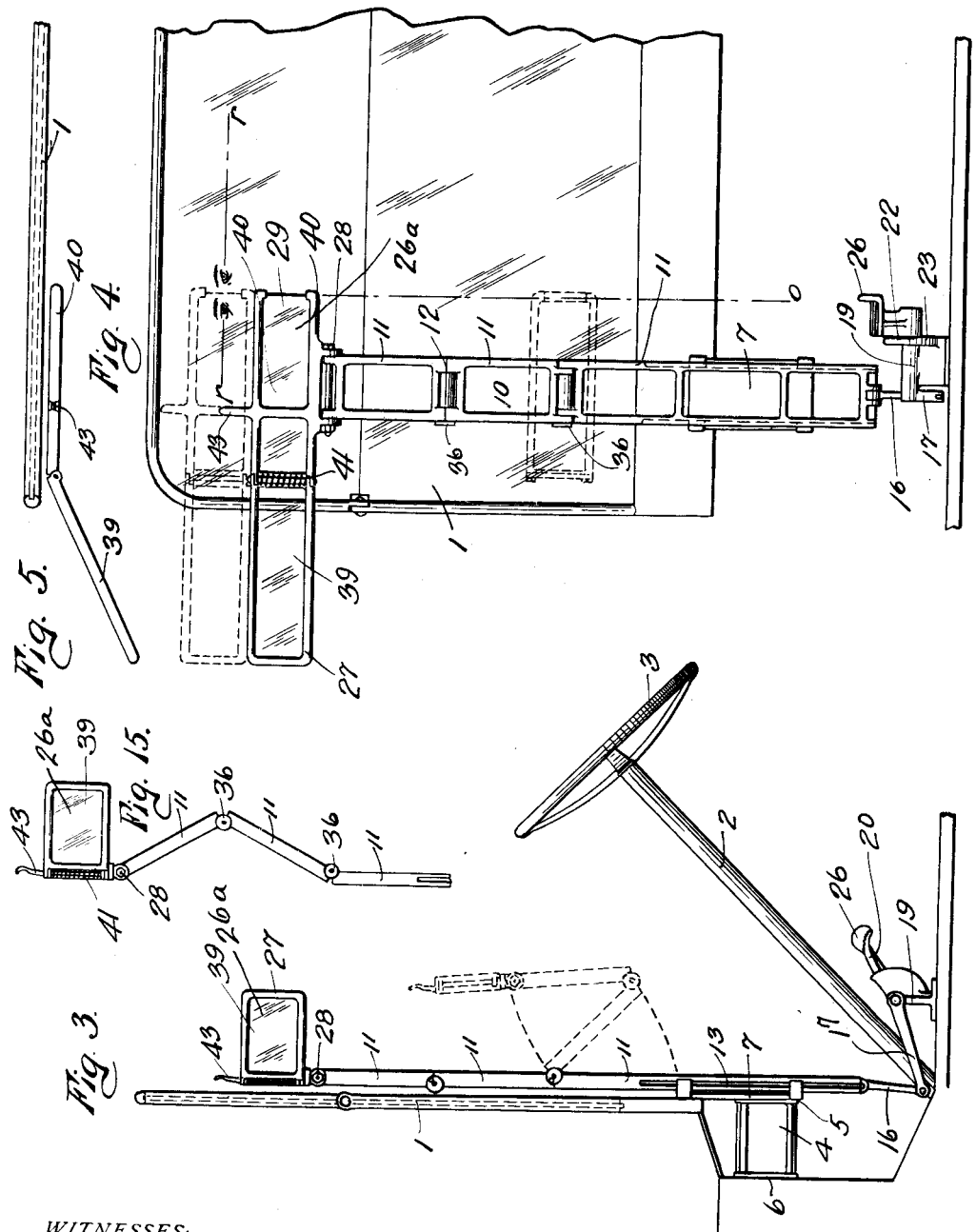

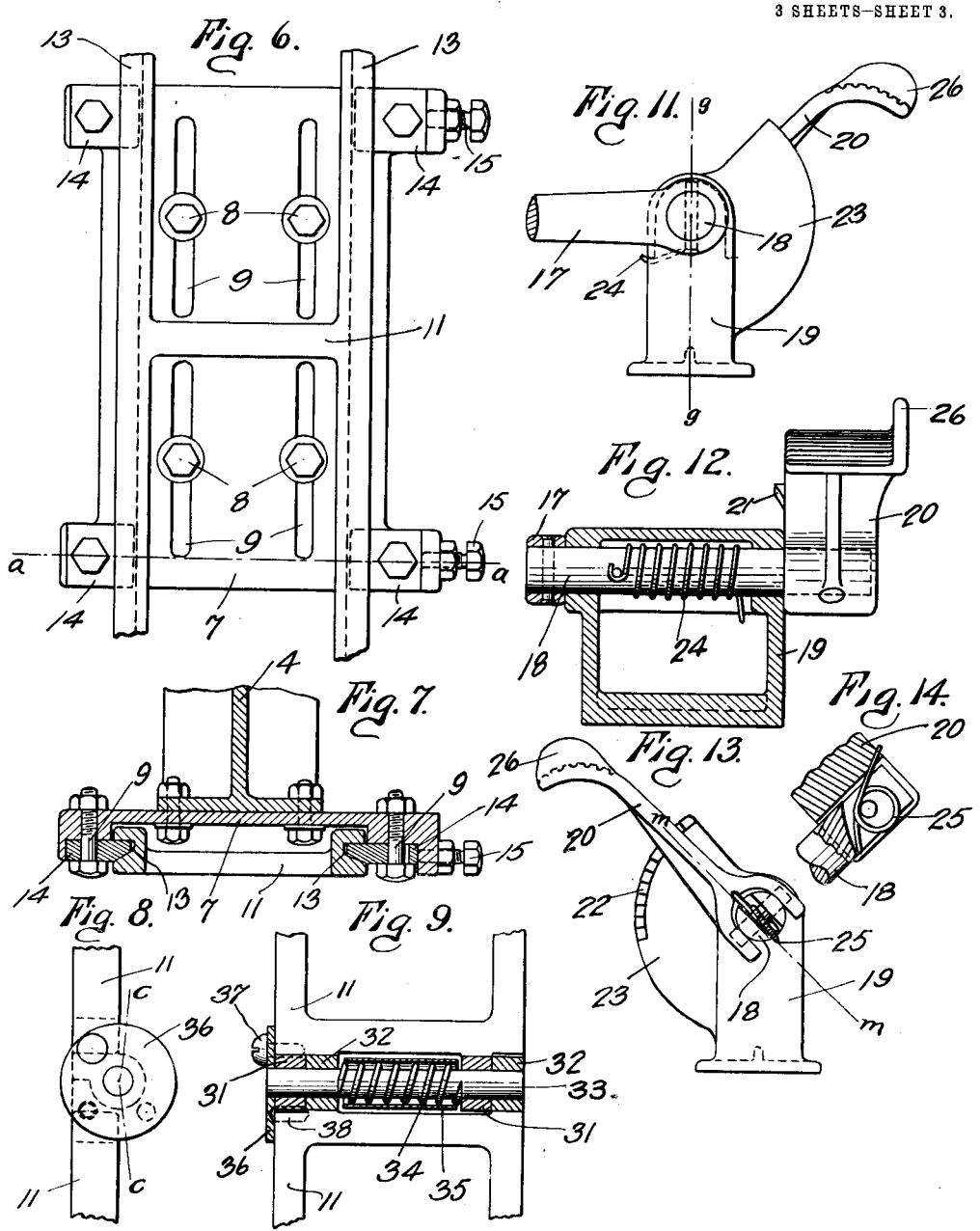

UNITED STATES PATENT OFFICE.

WILLIS J. PERKINS, OF GRAND RAPIDS, MICHIGAN.

LIGHT-FOCUS SHADE OR DIMMER ZONE.

1,109,014.  Specification of Letters Patent.  Patented Sept. 1, 1914.

Application filed January 31, 1913. Serial No. 745,356.

*To all whom it may concern:*

Be it known that I, WILLIS J. PERKINS, a citizen of the United States, and a resident of the city of Grand Rapids, in the county of Kent and State of Michigan, have invented a certain new and Improved Light-Focus Shade or Dimmer Zone, of which the following, taken in connection with the accompanying drawings, which show a preferred form of my invention, is a specification.

This invention is a development of my invention disclosed in my former application, Serial Number 715,868, and the object of this invention is to provide vehicles of transportation on land, sea, or in the air, that have chauffeurs, pilots, guides or drivers, (said persons being hereafter designated as drivers), to control their direction of travel, speed or method of propulsion, or either, with a suitable device, which when placed before the eyes of the driver through suitable manually operated means, provides said driver with a light intercepting shade or dimmer zone, through, over, under or around which observation may be made at the option of the driver without his being blinded by natural or artificial lights, regardless of their brilliancy or focal intensity, in the act of meeting, passing or traveling toward said lights.

To these ends, I have made the invention consisting essentially of a means for dimming, screening or absorbing the focal rays of light in the visual range of the driver, such means being suitably attached to the vehicle of transportation or members thereof, and under control of the driver thereof to be adjusted by suitable manually operated means, and having construction such that when not in service it may be located entirely out of the way as in the daytime, or partially out of the way at night time and previous to service adjustment, allowing freedom of visual outlook but subject to instant adjustment by the driver to place it in service protective or operative position, securing and providing for the driver at all times, a clear visual outlook without the usual annoying and dangerous conditions produced by the focal glare of meeting or passing vehicles.

Various other objects and purposes will be apparent as the descriptions of the embodiments shown in the drawings progresses, therein being shown some forms of practically applying my invention, although it is not attempted to show all of the many and various forms of applications that have occurred to me in reducing this invention to practical form.

In the drawings, Figure 1 is a side view of a portion of the fore part of an automobile with my invention applied thereto, the view being taken as from the left of Fig. 2. Fig. 2 is a view from the right of Fig. 1, showing the invention applied to an automobile having a right hand side drive and also provided with a wind shield. Figs. 3 and 4 are views similar to Figs. 1 and 2 respectively, but illustrating my invention applied to an automobile having a left hand side drive. Fig. 5 is a view looking down on Fig. 4. Fig. 6 is a front elevation of the bracket and slide member by means of which my invention is attached to an automobile and is operated thereon. Fig. 7 is a sectional view taken on the line $a$—$a$, Fig. 6. Fig. 8 is a side elevation of a preferred form of column joint used in my device. Fig. 9 is a section on the line $c$—$c$, Fig. 8. Fig. 10 is a section of the shade or dimmer zone proper, on the line $e$—$e$, Fig. 2. Fig. 11 is a side elevation of the foot pedal by which the vertical adjustment of the zone is accomplished. Fig. 12 is a section thereof taken on the line $g$—$g$, Fig. 11. Fig. 13 is a view similar to Fig. 11 but from the opposite side of the pedal. Fig. 14 is a section as it appears taken on the line $m$—$m$, Fig. 13. Fig. 15 is a side elevation of the dimmer zone or intercepting shade and the supporting column therefor showing the column adjusted for the bowed-in type of wind shield. Fig. 16 is a side elevation of the zone or shade supported on a column having a different form of vertical adjustment from service to daylight or out-of-use position.

Similar reference numerals refer to similar parts throughout the several views of the drawings.

In the preferred form of my invention, I have shown its application to an automobile having a windshield. The device is wholly independent of the windshield, the same being merely illustrative, and the invention is applicable in suitable design for any vehicle of transportation, whether equipped with a windshield, or dash or not, and can be used whether or not the shield is in service position. In the preferred form shown, the automobile has the usual wind shield 1, of any desired form or type secured in front of the post 2 and pilot wheel 3 in the usual manner. Back of the windshield I have positioned my dimmer zone or shade and it may be spaced any desired distance from the shield, said shield being foldable either to the front or rear as may be desired.

The zone is attached by means of a suitable bracket 4 to the vehicle, the faces 5 and 6 of the bracket being attached to the slide member 7 and to vehicle parts, respectively. Two different forms of brackets 4 are shown in Figs. 1 and 3, as suitable for application to different portions of the vehicle, and in any event, the bracket 4 will be designed to fit the particular conditions of the vehicle so as to present a vertical face 5 against which the bracket and slide member 7 may engage. This member 7 is secured to the bracket 4 by means of bolts 8 which pass through slots 9 in the member 7 whereby said member 7 may have vertical adjustment with respect to the bracket 4 but be rigidly secured thereto in desired position.

The dimmer zone or shade proper is supported by a suitable vertical column 10 which in the forms shown in Figs. 1 and 4 is made up of a plurality of sections 11 hinged at 12 whereby the column may be folded into short compass when desired. The lower section is provided with slots 13, one in each edge thereof, in which engage the opposing slide members 14, which are attached to the member 7 as shown, the adjustment of the distance between the opposing slide members 14 being regulated by screws 15 bearing against and forcing one of the members 14 inward as shown in Fig. 7, a slot in said member allowing such adjustment. This specific adjustment may be varied, it is evident, so long as the function of allowing the free sliding movement of the lower section 11 in a vertical direction is secured. At the lower end of the lower section, a link 16 is pivotally attached at one end while its other end is pivoted to the end of the arm 17, the other end of which is pinned to a short shaft 18 mounted in the casting 19, said casting being preferably secured to a fixed member of the vehicle, the floor being utilized in this instance as shown. The shaft 18 extends through the casting and has secured thereto on the opposite side of the casting, a pedal 20, the downward operation of which is designed to turn the shaft 18 on its axis to thereby lift the arm 17 and give vertical movement to the link 16 and the attached members against the weight thereof. The link 16 may be adjustable in length or of variable length so that the column may be supported above the floor the desired distance and the pedal and shaft support may rest on and be attached to the floor; and in different types of vehicles, the link 16 may be of different lengths, this variation, however, being easily cared for.

The pedal 20 preferably carries on its side nearest the casting 19, an integrally formed dog 21 which is positioned to engage with ratchet teeth 22 located on the wing 23 of the casting, whereby when the pedal is depressed the dog engaging with the ratchet will serve to normally prevent the return of the pedal to upper position, which under the influence of the weight of the adjusted parts and of the torsional resistance of spring 24 surrounding shaft as shown in Fig. 12, it would tend to do. The construction by which the pedal is allowed to pass by the ratchet teeth and then engage therewith is illustrated in Figs. 13 and 14 and shows the pedal pinned to the shaft 18 so as to have a limited lateral movement by turning about the pin, a spring 25 passing around the pin and having its ends engaging the shaft and the pedal serving to normally press the pedal against the wing 23, but yielding on the downward operation of the pedal to allow the dog to slip by the teeth of the ratchet. If, however, it is desired to release from the ratchet for the return of the pedal, the operator may press laterally against the upstanding ledge or lip 26 cast integral with the pedal and operate the pedal to the side sufficiently to separate the dog and ratchet thereby freeing the pedal to return to its initial or other desired position.

The intercepting shade or dimmer zone proper, denoted as a whole by reference numeral 26ª, is attached at the upper end of the upper section of the column. Various methods of attachment may be used, Figs. 1 and 2 showing the frame member 27 of the zone or shade secured in rigid relation to the upper section 11 by means of bolts, while in Figs. 3 and 4 the frame has pivotal attachment to the upper section at 28. Any suitable means of attachment as desired may be used. The zone illustrated in Figs. 1 and 2 is designed for use in machines having a right hand side drive, that is where the driver sits on the right of the car. In this country it is required that meeting vehicles shall turn to the right, and, accordingly, a driver of a machine must keep looking to the left in order to keep the vehicle he meets in view. It is evident therefore that he will seldom or never be troubled by lights on vehicles on his right to an extent preventing his protection by a slight shift of the head and eyes to the left and bringing the zone or shade in intercepting range with the focal rays the driver wishes to screen himself from. For the above reason, the zone need not extend to the right of a normally vertical line drawn midway between the driver's eyes, minimizing his shifting range for clearer vision ahead or vision through the dimmer zone or intercepting shade. The right hand end of the zone may terminate substantially in the plane of the axis of the steering post, said axis being substantially a line drawn midway between the driver's eyes when in normal sitting posture at the steering wheel. Such plane or axis is indicated by broken line o—o, in Figs. 1 and 2, and the supporting column may for convenience or artistic effect be located some distance to the left of this plane. With the right hand drive the shade or zone proper consists of a frame member 27 which may for strength or otherwise be divided by a cross piece or tie 28' into two sections, in which is located a plate of suitable colored or tinted glass celluloid, or other equivalent substance, or said trans-medium may be a continuous piece or multiple pieces. This medium when interposed in front of the eyes will intercept, absorb, screen or dim the light coming to the eyes, but will not cut out or eliminate all the rays of light or prevent a predetermined amount of observation through the same. The clearness of vision through the shade or zone is determined by the coloring or tinting of the intercepting medium, according to the judgment and experience of the manufacturer or designer, and so proportioned as to prevent the driver from being blinded by exterior lights while reserving a sufficiently clear vision to enable him to distinguish readily the passing vehicle and occupants therein. One method of attachment of the plates indicated at 29 to the frame 27 is shown in Fig. 10, there being a suitable recess formed in the frame around its edge in which the plate seats and a binding strip or member 30 placed thereover and secured to the frame by screws as shown. It of course is evident that many other methods of securing the plates in place will readily occur to those skilled in the art and I do not limit myself to this construction. The zone or shade extends to the left to the edge of the wind shield so that there is provided a long dimming or shading portion to the left of the driver.

The hinging of the sections 11 of the supporting column is accomplished by means of the hinge construction shown in Figs. 8 and 9, there being in effect a combined hinge and lock construction provided. The upper and lower sections to each side of the hinge have each integral therewith ears 31 on the upper section and 32 on the lower section which lie in different planes so as to pass by each other, and these ears are provided with alining openings for the reception of the hinge pin or rod 33. A coiled spring of considerable strength is shown at 34 as lying between an ear 31 and an ear 32 and pressing thereagainst, and such spring may be inclosed in the sleeve 35 to add to the appearance of the structure. A member 36 is attached by screw 37 to the upper section, and it has therein a plurality of recesses formed in its inner face and in which a pin 38 projecting from the lower section is adapted to seat. It is of course obvious that the position of the pin and member 36 on the sections of the column may be interchanged without difference in functional operation. With this structure, and with the pin seated in one of the recesses of the member 36, there will be resistance made to the folding of the sections, as in order to accomplish the folding, it is necessary to compress spring 34 in moving the upper section and its attached member 36 sufficiently to carry said member away from the pin and disengage the pin and recess. Then when the parts are turned to bring the pin in conjunction with another recess, the spring will act to frictionally and spring lock the parts again in place. In this manner the sections of the column may be retained in a variety of positions relative to each other, either with all the sections in a line making a vertical column, or with all of them folded into small compass, or with them as shown in Fig. 15, with the sections in different angular relations.

Without at present going any farther in the description of the structure, the operation of the device so far as set forth may now be described.

During the daytime, the dimmer zone or intercepting shade will be of little or no use and at this time it is folded in compact form below the driver's normal visual range with the frame 27 taking the position shown in the lower dotted lines, Figs. 2 and 4. The hinges will retain the sections in folded position and the device as a whole will be out of the way, above any of the gages, speedometers, or other attachments usually found on such vehicle, yet low enough not to be objectionably noticeable. When the night time comes, the device is useful to its fullest extent, and at that time the column is unfolded, the operation thereof being shown in dotted outline in Fig. 3, and the zone takes the position shown in full lines, Figs. 1 and 2. This may be denoted as the pre-service position of the zone, for in this position, the sight is not obstructed in any manner by the device, the plane of the driver's eyes being at r—r, Figs. 2 and 4. Suppose now, however, that the condition arises that the driver wants to screen his eyes from a brilliant exterior light. He immediately manually operates the means provided and as described heretofore, the column is given movement in a vertical direction, bringing the zone or shade to the upper dotted line position shown which may be denoted as the protective service position, in which position, the driver is protected from the focal glare of exterior lights. It will be noted that the driver has outlook around the end of the zone or shade due to the limiting of the length thereof to the right, but that by a very slight movement of the head, he may bring both eyes behind the zone at will, and that as the exterior light becomes nearer and passes to one side of the driver, he may follow it the length of the zone with his eyes and be protected from the focal blinding rays thereof until the lights have passed. It is to be understood in the use of the terms "left" and "right", that a construction is being described which will be used in those jurisdictions where meeting vehicles are obliged to turn out to the right, and that if, as in other countries, the rule was the other way, the zone would be correspondingly altered so that its major portion would extend to the right of the supporting column, the functions performed being the same. After the zone or shade is adjusted to focal protective service position, it may be left there as long as desired, the dog 21 in engagement with the ratchet teeth 22 holding it in upper position until by pressing the pedal laterally, it may be returned to pre-service position and left there until again needed.

In the operation of the column vertically in making the required adjustments, it is evident that there must be enough play to allow free movement of the sliding parts over each other without undue friction, and that any rattling will be objectionable. To provide for these conditions, I make the sliding parts wholly or partly of sound deadening or non-resonant material such that even though there is a little necessary contacting of parts, the effect thereof will not be noticeable. And with certain types of windshields which do not occupy a vertical plane but are adjusted with sections thereof in different planes inclined to the vertical, the column is adjusted to correspond as shown in Fig. 15, the pivotal attachment of the zone to the upper section of the column allowing it to be positioned in a vertical plane irrespective of the inclination of its attached column section.

So far the description has had to do with the zone as constructed for a car having a right hand side drive. When it is applied to a car having the left hand side drive, modifications of the zone are desirable owing to the different conditions encountered. The driver sits on the left and nearer the vehicles that he meets, and the protective zone or shade must be extended to the left for his protection beyond the edges of the windshield or the vehicle side, and it is preferable that this portion beyond the shield or side shall be capable of retraction within the side limits of the vehicle so that it can be put out of the way when not in use. To serve these ends, I have modified the construction of the protective zone proper as shown in Figs. 3, 4 and 5, the frame being divided near the side edge of the windshield and the left hand portion 39 thereof pivoted to the relatively stationary section 40, so that it may fold thereon and occupy about half the normal unfolded space. In the daylight folded adjustment of the device, the zone proper occupies a position as shown in the lower dotted lines in Fig. 4, or the position may be varied as desired by changing the lengths of the sections 11 of the supporting column. When in position for use, the hinged section 39 is turned to its open position, and is held there by use of the same or an equivalent structure that is used in holding the sections of the column in proper positions, said open position of the zone not being with the sections thereof in a straight line but with the hinged section 39 lying forward at an angle to the relatively fixed section 40, whereby the hinged section need not be as long for the protection of the driver as would be the case if the sections were in the same plane. The hinge is positioned so as to lie practically in front of the frame of the windshield when the driver looks at an angle which includes the windshield frame in his vision, to thereby have as little obstruction to the vision as possible. Spring 41 performs the same function relative to the hinging and locking of sections 40 and 39 as does spring 34 with reference to column sections 11.

It is not necessary that the column shall be folded in order to carry the zone to daylight retracted position but the same result may be secured by making the column sections telescopic as shown in Fig. 16 wherein is shown the sections 42 mounted to be extended to full length position when in use, but adapted to be telescoped to occupy little vertical space and with the zone carried thereby in daylight in operative position.

Various other suitable modifications will occur to those skilled in the art.

The operation of the self-protective zone with the left hand drive, excepting for the folding and unfolding of the hinged section, is identical with that previously described relative to the right hand drive. In both instances, it is clear that the zone has three adjustments, namely, the daylight out-of-service adjustment, the operative pre-service adjustment, and the operative focal protective adjustment, the first being that used when the zone is not in operation at all, nor needed; the second being that used when driving with a clear field ahead and no exterior lights in view; and the third used when an exterior light is met, to thereby shield the eyes of the driver and allow him unimpaired vision at all times. And the operation from pre-service to service adjustment is always under the control of the driver as well as the return from the service to pre-service adjustment. The folding of the column or the unfolding thereof is accomplished manually, and there may be provided a handle for ready engagement, on the frame of the zone or shade, indicated at 43, whereby the folding and unfolding may be rendered easier.

I have fully disclosed my invention and indicated some operaitve constructions by which it may be embodied. Such constructions are not the only ones that may be utilized to reduce my invention to practical form, however, and I consider myself as entitled to all variations in structure and substitutions of equivalent parts which fall within the scope of the appended claims and do not depart from the spirit of the invention. The specific disclosure made is merely illustrative and diagrammatic of the invention and is not to be taken in any sense as limiting the invention to any specific structure.

What I claim as new and desire to secure by Letters Patent is:—

1. In combination with a vehicle, a protective dimmer zone or shade, a supporting member therefor, means whereby said member and zone or shade may be vertically adjusted with reference to the vehicle and means manually operable at will to effect such vertical adjustment of the zone or shade and supporting member.

2. In combination, a vehicle, a protective dimmer zone or shade associated therewith, means to support said zone or shade, and means whereby said supporting means may be adjusted in sections relative to each other and as a whole relative to the vehicle.

3. In combination, a protective dimmer zone or shade, a supporting means therefor, means whereby said supporting means may be slidably adjusted vertically and means manually operable at will to effect such vertical slidable adjustment of the supporting means.

4. In combination, a protective dimmer zone or shade, a supporting means therefor comprising a plurality of sections attached together and adjustable with respect to each other, means for slidably supporting one of the sections and means operatively associated with such section to effect its slidable movements and hold it at different positions relative to its support.

5. In combination, a protective dimmer zone or shade, a vehicle, means to support the zone on the vehicle at a predetermined position above the floor of the vehicle, means whereby the supporting means may be adjusted to lower the zone or shade to inoperative position, means whereby the zone may be operated to a third position above the first mentioned position and means associated with the zone or shade and manually operable to effect the adjustment of the zone or shade at will to the first or third mentioned positions.

6. In combination, a protective dimmer zone or shade, a vehicle, means whereby the zone may be supported on the vehicle a distance above the floor thereof, means whereby the supporting means may be adjusted to elevate the zone or shade to a second position, means whereby the zone or shade may be elevated to a still higher position and at will be retracted to the second position and means for manually adjusting the zone or shade between the second and third mentioned positions.

7. In combination, a vehicle, a light intercepting medium located at the front of the vehicle, said medium including a portion partially intercepting the rays of light coming thereto, means to support said medium and means to adjust said medium back and forth about an axis fixed transverse to the longitudinal center line of the vehicle, said medium being operable to normal operative position above said axis and means to manually operate said medium to and from operative position.

8. In combination, a protective dimmer zone or shade, a support therefor comprising a plurality of sections hinged together, means whereby the sections may be adjusted to lie one behind the other and be retained in said position, or to lie one above the other and retained in that position, means whereby the zone or shade and its support as a whole may be vertically adjusted and means associated with the zone or shade support for manually adjusting the support as a whole vertically.

9. In combination, a vehicle adapted to be controlled in its movements by an attendant, a light intercepting medium supported on the vehicle in front of the normal driving position of the attendant, said medium formed of material which partially intercepts the rays of light coming thereto, means whereby the medium may be adjusted vertically with respect to the vehicle and held fixedly in transverse position with respect to the vehicle during such adjustment, and means for adjusting said medium back and forth about a fixed transverse axis, said axis lying parallel to the plane normally occupied by the windshield when applied to the vehicle.

10. In combination, a vehicle adapted to be controlled in its movements by an attendant, a light intercepting medium supported on the vehicle in front of the normal driving position of the attendant, said medium comprising a member which partially intercepts the rays of light coming thereto, said medium located immediately to the rear of the position occupied by the windshield when applied to the vehicle, a column supporting said medium and holding said medium in fixed position transverse of the vehicle, and means whereby said medium may be adjusted back and forth about an axis fixed in a transverse and vertical plane of location with respect to the vehicle.

11. In combination, a protective dimmer zone or shade, a support therefor, means connecting said support to a pedal, and means whereby said zone or shade and the support therefor may be adjusted to another position on operation of the pedal.

12. In combination, a protective dimmer zone or shade, supporting means therefor, said means adjustable to carry the zone or shade between positions substantially in the same vertical plane, means whereby the zone or shade may be adjusted between the upper of said positions and a third position and means manually operable at will to adjust the zone or shade back and forth between said second and third positions.

13. In combination, a protective dimmer zone or shade, a vehicle, means to support the zone on the vehicle a distance above the floor thereof, and foot operated means to adjust the zone at will to and from a position above said first mentioned position.

14. In combination, a protective dimmer zone or shade, a vehicle, means to adjustably support the zone above the floor of the vehicle, and foot operated means associated with the zone whereby it may be adjusted to different positions.

15. In combination, a protective dimmer zone or shade, a vehicle, means to support the zone or shade on the vehicle, means whereby the zone or shade may be adjusted to different positions with respect to the vehicle, means to manually adjust the zone at will to and from a position normally above the usual position of the zone or shade, and means to hold the zone in any position to which it may be adjusted.

16. In combination, a vehicle, a protective dimmer zone or shade associated therewith and adapted to occupy a plurality of positions above the floor of the vehicle, and means manually operable from beneath the zone or shade associated therewith whereby the adjustment of the zone or shade between the limits of its movements may be controlled, and means holding the manually operable means in any position to which it may be operated.

17. In combination, an automobile, a dimmer zone attached thereto in proximity to the plane of the wind shield thereof, means whereby the zone may be positioned normally out of the visual line of sight of the driver thereof, means positively holding said zone in any position to which it is adjusted and means for manually adjusting at will the zone or shade to a plurality of positions at different vertical heights.

18. In combination, a vehicle, a dimmer zone or shade supported thereon and adapted to occupy three positions, a support for the zone having attachment to the vehicle and adjustable to carry the zone from one position to a second position and vice versa, means whereby the support and zone may be bodily adjusted from second to third position and vice versa and means manually operable at will to adjust the zone or shade back and forth between its second and third positions.

19. In combination, a vehicle adapted to be controlled in its movements by an attendant, a light intercepting medium supported on the vehicle in front of the normal driving position of the attendant, said medium comprising a member which partially intercepts the rays of light coming thereto, said medium located immediately to the rear of the position occupied by the windshield when applied to the vehicle, a column supporting said medium pivoted transversely to the longitudinal axis of the vehicle, a separate pivotal mounting of the said medium on said column transverse to the longitudinal axis of the vehicle and means whereby said medium and said column may be adjusted back and forth independently or together on their separate axes.

20. In combination, a vehicle adapted to be controlled in its movements by an attendant, a light intercepting medium supported on the vehicle in front of the normal driving position of the attendant, said medium comprising a member which partially intercepts the rays of light coming thereto, said medium located immediately to the rear of the position occupied by the windshield when applied to the vehicle a column supporting said medium pivoted on an axis transverse to the longitudinal axis of the vehicle, a separate pivotal mounting of the said medium on said column transverse to the longitudinal axis of the vehicle, means whereby said medium and said column may be adjusted back and forth independently or together on their axes and locking means to hold said medium in a predetermined pivotal adjusted position.

21. In combination, a vehicle adapted to be controlled in its movements by an attendant, a light intercepting medium supported on the vehicle in front of the normal driving position of the attendant, said medium comprising a member which partially intercepts the rays of light coming thereto, said medium located immediately to the rear of the position occupied by the windshield when applied to the vehicle, a column supporting said medium and holding said medium in fixed transverse position on the vehicle, means whereby said medium may be adjusted back and forth about an axis fixed in a transverse and vertical plane of location with respect to the vehicle and locking means to hold said light intercepting medium and supporting column in predetermined transverse pivoted position.

22. In combination, a vehicle of transportation having a seat therein, means for guiding the vehicle located in front of the seat, means for partially intercepting rays of light located in front of the guiding means, said means including a dimming zone the major portion of which is located to one side of the guiding means and a support therefor attached to the vehicle, said support holding the zone at all times in a plane transverse to the longitudinal center line of the vehicle and parallel to the transverse center line thereof.

23. In combination, a vehicle of transportation having a seat therein, a steering post located in front of the seat, means for partially intercepting rays of light located in front of the steering post, a wind shield secured to the vehicle and adapted to be located transverse thereof in normal service position, means for supporting the light intercepting means directly behind the position occupied by the windshield when in service position, said supporting means holding the light intercepting means at all times in transverse planes parallel to the transverse center line of the vehicle and with substantially the entire body of the light intercepting means located to one side of the axis of the steering post.

24. In a vehicle of transportation, a seat, a steering post located in front of the seat and a dash located in front of the steering post, a support secured to the dash, a dimming zone carried by the support said support holding the zone transversely of the vehicle and always in a plane parallel to the transverse center line of the vehicle, said zone comprising a comparatively long and narrow section of material adapted to partially intercept the rays of light coming thereto and secured to the support with substantially the entire body thereof located to one side of the axis of the steering post.

25. In a vehicle of transportation, a seat, a support secured to the vehicle in front of the seat, a dimming zone carried by the support and held by the support at all times in planes parallel to the transverse center line of the vehicle, said zone comprising a comparatively long and narrow section of material adapted to partially intercept the rays of light coming thereto and secured to the support with substantially the entire body thereof located to one side of a plane parallel to the longitudinal center line of the vehicle and passing through the center of said seat, whereby an attendant occupying the seat may have vision directly ahead but be protected from intense lights on the side toward which the dimming zone extends.

In testimony whereof, I have hereunto affixed my signature in the presence of two witnesses.

WILLIS J. PERKINS.

Witnesses:
 PETER HOUSE,
 E. J. LATHROP.